US008600165B2

(12) United States Patent
Saubat et al.

(10) Patent No.: US 8,600,165 B2
(45) Date of Patent: Dec. 3, 2013

(54) OPTICAL MARK CLASSIFICATION SYSTEM AND METHOD

(75) Inventors: Nicolas Raphaël Saubat, Sainte-Geneviéve-des-bois (FR); Francois Ragnet, Venon (FR); Philippe Rerole, Fontaine (FR); Eric H. Cheminot, Meylan (FR); John A. Moore, Victor (FR)

(73) Assignee: Xerox Corporation, Norwalk, CT (US)

( * ) Notice: Subject to any disclaimer, the term of this patent is extended or adjusted under 35 U.S.C. 154(b) by 744 days.

(21) Appl. No.: 12/704,792

(22) Filed: Feb. 12, 2010

(65) Prior Publication Data

US 2011/0200256 A1 Aug. 18, 2011

(51) Int. Cl.
*G06K 9/46* (2006.01)
*G06K 9/00* (2006.01)
*G06K 7/10* (2006.01)

(52) U.S. Cl.
USPC ............................. 382/190; 382/181; 382/321

(58) Field of Classification Search
None
See application file for complete search history.

(56) References Cited

U.S. PATENT DOCUMENTS

| | | | |
|---|---|---|---|
| 5,040,226 A * | 8/1991 | Elischer et al. ............... | 382/138 |
| 6,357,658 B1 * | 3/2002 | Garczynski et al. ..... | 235/462.01 |
| 6,736,319 B2 | 5/2004 | Swanson et al. | |
| 6,741,738 B2 | 5/2004 | Taylor | |
| 7,388,990 B2 * | 6/2008 | Simon et al. .................. | 382/209 |
| 7,406,392 B2 | 7/2008 | Gedlinske et al. | |
| 7,573,616 B2 | 8/2009 | Poor | |
| 2004/0126036 A1 | 7/2004 | Poor | |
| 2006/0120627 A1 * | 6/2006 | Shiiyama ...................... | 382/305 |
| 2009/0232404 A1 | 9/2009 | Cohen | |

OTHER PUBLICATIONS

Arganda-Carreras, et al. Consistent and Elastic Registration of Histological Sections using Vector-Spline Regularization, Lecture Notes in Computer Science, Springer Berlin / Heidelberg, vol. 4241/2006, *CVAMIA: Computer Vision Approaches to Medical Image Analysis*, pp. 85-95, 2006.
http://biocomp.cnb.csic.es/~iarganda/bUnwarpJ/ accessed Feb. 12, 2010.
http://elastix.isi.uu.nl/ accessed Feb. 12, 2010.
Insight Segmentation and Registration Toolkit (ITK) (see www.itk.orq) accessed Feb. 12, 2010.

(Continued)

*Primary Examiner* — David Zarka
*Assistant Examiner* — Ryan P Potts
(74) *Attorney, Agent, or Firm* — Fay Sharpe LLP

(57) ABSTRACT

A system, method, and apparatus for mark recognition in an image of an original document are provided. The method/system takes as input an image of an original document in which at least one designated field is provided for accepting a mark applied by a user (which may or may not have been marked). A region of interest (RoI) is extracted from the image, roughly corresponding to the designated field. A center of gravity (CoG) of the RoI is determined, based on a distribution of black pixels in the RoI. Thereafter, for one or more iterations, the RoI is partitioned into sub-RoIs, based on the determined CoG, where at a subsequent iteration, sub-RoIs generated at the prior iteration serve as the RoI partitioned. Data is extracted from the RoI and sub-RoIs at one or more of the iterations, which allows a representation of the entire RoI to be generated which is useful in classifying the designated field, e.g., as positive (marked) or negative (not marked).

25 Claims, 7 Drawing Sheets

(56) References Cited

OTHER PUBLICATIONS

XwScan for Optical Mark Recognition Forms http://www.xerox.com/digital-printing/workflow/printing-software/xwscan/enus.html accessed Jan. 7, 2010.

OMR Software: Gravic Remark Office OMR for Xerox http://www.office.xerox.com/software-solutions/gravic-remark-office-omr/enus.html accessed Jan. 7, 2010.

OMR Software: Gravic Remark Office OMR (Multifunction Capabilities) for Xerox http://www.office.xerox.com/software-solutions/gravic-remark-office-omr/enus.html accessed Jan. 7, 2010.

Formsuite SDK|Forms Processing Suite SDK|Document Imaging . . . http://www.accusoft.com/formsuite.htm accessed Jan. 7, 2010.

Dispatcher™ Revolutionary Classification http://74.125.93.132/custom?q=cache:qlG4zqbB7PcJ:www.imageaccesscorp.com/software/pdf/Dispatcher.pdf+software+solutions+dispatcher&cd=1&hl=en&ct=clnk&gl=us&client=google-coop accessed Jan. 7, 2010.

FormFix—structured forms processing and OMR SDK http://www.accusoft.com/formfix.htm accessed Jan. 7, 2010.

* cited by examiner

OPTICAL MARK CLASSIFICATION SYSTEM AND METHOD

BACKGROUND

The present application relates to optical mark recognition (OMR). It finds particular application in connection with a method and apparatus for automatic recognition of when a hand-drawn mark has been made within a particular region of a user-completed document, such as a standardized test form.

Machine readable forms are now widely used for a variety of applications, including for standardized tests, job applications, survey questionnaires, census data collection, inventory control, market research, and the like. Such forms have preprinted data as well as one or more designated fields for user input. Typically, a person completing the form is asked to make handwritten marks, such as check marks, completed circles, or a signature, in pencil or ink in designated fields of the preprinted form in order to designate answers to various queries or sign the form. The form containing the user's handwritten marks is then later processed to identify the user's responses. This may entail scanning the form with an optical scanner. The designated fields are then identified, e.g., by comparing the scanned form to a blank form and compensating for any change in orientation and/or size of the form during the scanning process. The designated fields are then automatically examined and user-applied marks are recognized. Based on the marks recognized, responses of the user are inferred. If the form is a test form, the responses may be compared with predetermined responses for scoring purposes.

Optical mark recognition refers to the process of recognizing the presence of handwritten marks on a scanned document. OMR is somewhat different from optical character recognition (OCR), which seeks to assign a single character from a predefined character set to each printed mark. OMR aims to identify whether a user has applied a mark to a designated field. While there are many techniques for performing optical mark recognition, the techniques are typically very sensitive to both the original mark quality as well as document scanning factors (resolution, image quality, and registration). In the case of registration, this can only be achieved to within a few pixels, e.g., up to a dozen pixels. A misregistration of 5-10 pixels can, however, have measurable effects on the ability to identify marks within small checkboxes. Human markings also exhibit considerable variability. Users have their own ways of checking a checkbox, for example, which can have significant effects on the recognition. Image quality and scan variability also impact recognition. In particular, for grayscale forms, thresholding variations can change a given document considerably, such that simple black pixel counts do not always work well for identifying marks.

INCORPORATION BY REFERENCE

The following references, the disclosures of which are incorporated herein in their entireties by reference, are mentioned:

U.S. application Ser. No. 12/241,488, filed Sep. 30, 2008, entitled XEROGRAPHIC FUSING SYSTEM, by Russel, et al., discloses a fusing system for use with a printing apparatus. The system includes a fuser roll cleaning strip formed of flexible material. The strip includes a detectable mark. A sensor is positioned adjacent the strip. When a substantial amount of the strip has been taken up by a take-up roll, the detectable mark is detected by the sensor and a signal is transmitted to a controller.

U.S. Pat. No. 6,741,738, issued May 25, 2004, entitled METHOD OF OPTICAL MARK RECOGNITION, by Taylor, discloses a method of identifying when a particular hand-drawn selection has been made on a standardized test form. The method utilizes a scanned "blank" form which is then compared with a form containing user markings thereon. As a first step, the user's form is mathematically iteratively aligned with the scanned blank form. As a next step, a fine-scale refinement is applied to each individual "bubble" (i.e., response field) of the user's form to bring that feature into near exact alignment with the same bubble on the blank form. Finally, a quantitative measure of the similarity between the blank and user forms is used to determine whether or not the user has made a mark on the form within that response region.

US Pub. No. 20090232404, published Sep. 17, 2009, entitled SYSTEM AND METHOD FOR OPTICAL MARK RECOGNITION, by Cohen, discloses a method for creating a page template corresponding to a form for use in a mark recognition system which includes identifying at least one path of traversal across a form, detecting edge transitions along each such path, and creating a page template using the detected edge transitions.

U.S. Pub. No. 20040126036, published Jul. 1, 2004, entitled METHOD AND APPARATUS FOR SELECTIVE PROCESSING OF CAPTURED IMAGES, by Poor, discloses a method for identifying intended response marks in an optically scanned image of a response sheet having key marks and response targets printed in the same color. Pixel darkness values assigned by a digital imaging scanner are used to locate key marks and response targets and to identify response marks.

U.S. Pat. No. 7,573,616, issued Aug. 11, 2009, entitled ENHANCED DATA CAPTURE FROM IMAGED DOCUMENTS, by Poor, discloses a method for locating an area of interest within a digital image of a form captured by an imaging scanner. An image of a response form is captured by a scanner, and target areas for possible responses are located within the image based upon an expected location being adjusted as necessary for certain error-inducing defects in the forms or scanning process.

U.S. Pat. No. 6,736,319, issued May 18, 2004, entitled OPTICAL MARK READER, by Swanson, et al., discloses an optical mark reader including a scanner.

BRIEF DESCRIPTION

In accordance with one aspect of the exemplary embodiment, a method for mark recognition in an image of an original document includes receiving an image of an original document in which at least one designated field is provided for accepting a mark applied by a user. A region of interest is extracted from the image which pixels, at least some of the pixels corresponding to the designated field. A center of gravity is determined for the region of interest based on a distribution of black pixels in the region of interest. For at least one iteration, the method includes partitioning the region of interest into sub-regions of interest based on the determined center of gravity, where at a subsequent iteration, sub-regions generated at an immediately prior iteration serve as respective regions of interest and, for each of a plurality (or all) of the sub-regions of interest, extracting data from the sub-region of interest based on a distribution of black pixels in the sub-region of interest. A representation of the extracted region of interest is generated based on the data extracted from the sub-regions of interest for at least one of the iterations. Based on the representation, a mark recognition state is assigned to the region of interest.

In another aspect, a method for mark recognition in an image of an original document includes a) scanning an original document in which at least one designated field is provided for accepting a mark applied by a user, to generate a scanned image and receiving the scanned image into memory. With a processor in communication with the memory, the method includes b) extracting a region of interest from the scanned image which includes pixels, at least some of the pixels in the region corresponding to the designated field, c) extracting data comprising at least one of i) a center of gravity from the region of interest based on a distribution of black pixels in the region of interest, and ii) bit shift values across mutually perpendicular lines through the center of gravity of the region of interest. For at least one iteration, the method includes d) i) partitioning the region of interest into sub-regions of interest, where at a subsequent iteration, sub-regions generated at an immediately prior iteration serve as respective regions of interest, and ii) for each of the sub-regions of interest, repeating c). The method further includes e) generating a representation of the extracted region of interest based on the data extracted from the region of interest and sub-regions of interest, and f) based on the representation, assigning a mark recognition state to the region of interest with a trained classifier.

In accordance with another aspect of the exemplary embodiment, a system for mark recognition in an image of an original document includes memory which receives an image of an original document in which at least one designated field is provided for accepting a mark applied by a user. A region of interest extraction component is configured for extracting regions of interest from the image, such that each region of interest includes pixels corresponding to a respective one of the designated fields. A representation generation component generates a representation of the regions of interest including, for at least one iteration partitioning the region of interest into sub-regions of interest which meet at a center of gravity of the region of interest, extracting data from each sub-region of interest based on a distribution of black pixels in the sub-region of interest, and generating a representation of the extracted region of interest based on the extracted data. A classifier assigns a mark recognition state to the region of interest based on the representation.

DETAILED DESCRIPTION

Aspects of the exemplary embodiment relate to a method, system, and to an apparatus hosting a system for performing automatic optical mark recognition (OMR). The OMR may be combined with optical character recognition (OCR) for extracting printed data as well as handwritten data from the same scanned document.

The exemplary system and method employ a recursive centers of gravity technique to calculate a feature, such as a vector, for a candidate mark/region of interest. Features of labeled training samples can be used by a machine learning system to train a classifier to assign a class to the candidate mark, based on its vector. Aspects also relate to a method which facilitates building of the training set.

The exemplary method is much more robust for documents that are scanned in relatively poor quality, and which may suffer from artifacts such as those arising from poor resolution, low image quality, and misregistration. As a result, the need for human inspection and corrections is reduced.

The method is suited to the recognition of a variety of different types of human-applied marks in images generated by scanning documents, including a check mark placed in a checkbox (such as a ✓ or X), filled in bubbles, signatures, stamps, thumbprints, and other handwritten marks.

As used herein, a handwritten mark refers to any mark formed by hand, e.g., with a pencil, pen, or other writing implement on a sheet of paper or other print media. A candidate mark refers to a collection of pixels in a scanned digital copy of a document which may correspond to a handwritten mark or portion thereof.

A "document" is used herein to mean an electronic (e.g., digital) or physical (e.g., paper) recording of information. In its electronic form, a document includes image data. Image data may include text, graphics, or bitmaps. A document image may be in any suitable format, such as TIFF, JPEG, PDF, or the like. If appropriate, the document image may be converted to another format for processing.

The original hardcopy document, e.g., a form, to which a handwritten mark is applied, may include one or more common classes of designated fields, which can appear once or multiple times on a form. Each designated field includes a blank area for applying a mark, which may be bounded by a printed perimeter to indicate to the user where the mark should be applied. For example, a signature region will usually be unique in shape and size, while a checkbox can occur in multiple instances, e.g., a set of square printed boxes of the same height, each with white space inside. Designated fields, such as checkboxes can be grouped into "families", where the members of a given family all have the same aspect ratio and size.

Figure 1:
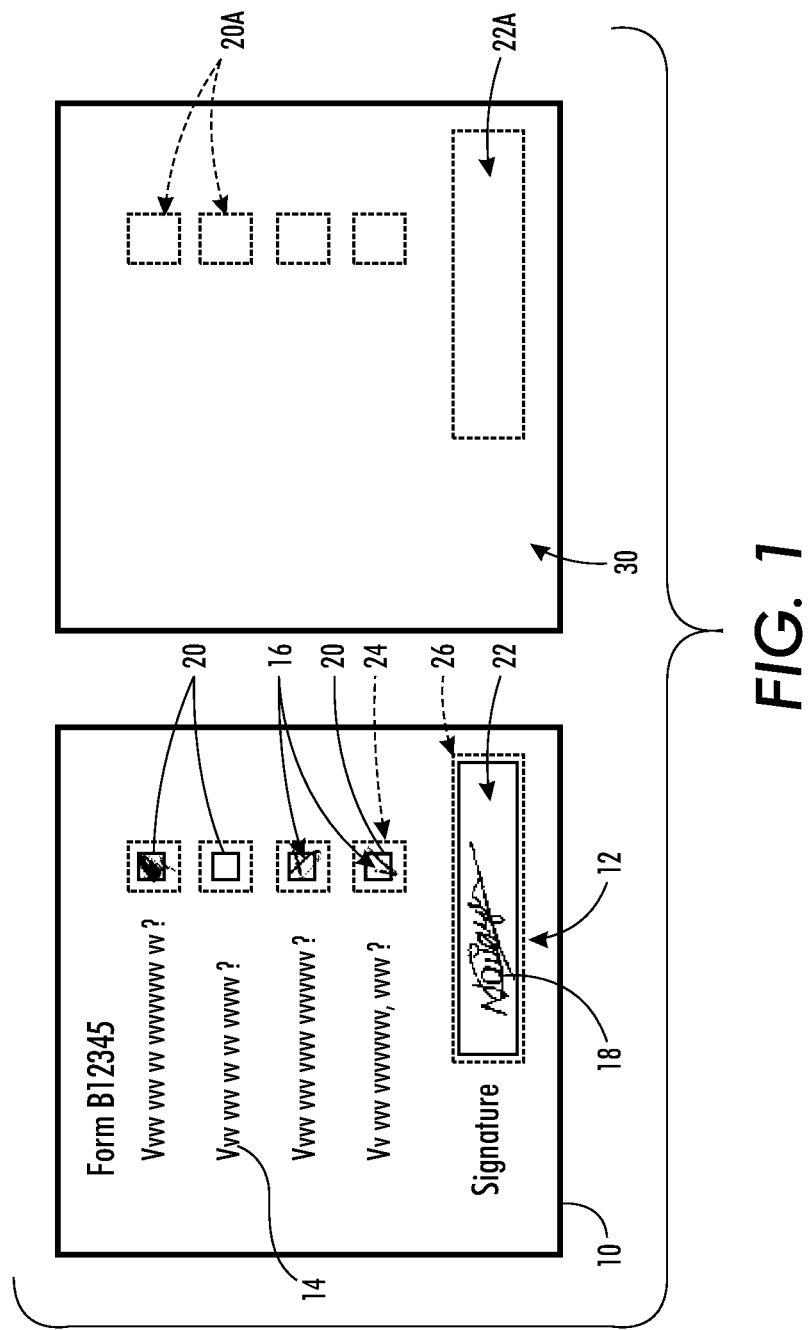
FIG. 1 is an illustration of a scanned document and a template for use in aspects of the exemplary embodiment.

By way of example, FIG. 1 illustrates a digital image 10 (destination image) formed by scanning an original hardcopy document on which an original form containing printed designated fields to which various marks have been applied by a user. The image 10 includes a destination form 12, with various printed text 14 and candidate handwritten marks 16, 18 in respective designated fields 20, 22, here shown as check marks 16 in a set of checkboxes 20 (a first family) and a signature 18 in a signature box 22 (a second family). Regions of interest (RoI) 24, 26 where candidate marks, if any, are expected to be found, are shown in phantom. These areas 24, 26 are extracted for further processing. Each RoI 24, 26 is intended to bound an area corresponding to a designated field 20, 22, i.e., the area where a checkbox or signature box is expected to be located on the scanned form 12. A template form 30, which contains designated fields 20A, 22A (corresponding in size and position to fields 20, 22 on the original form) but no candidate marks, may be scanned to allow registration of the designated fields 18, 22 and selection of RoIs.

Each RoI 24, 26 should be of sufficient size to ensure that the respective designated field 20, 22 is encompassed entirely or predominantly within it (e.g., at least 70% of the designated filed is extracted). However, where possible, an RoI should be small enough to avoid encompassing other printed marks 14 that are on the form, as well as other designated fields and their associated candidate handwritten marks 16, 18. In general, an RoI may be about 2-4 times the dimensions of the designated field. For example, in the case of a square check box which is 0.3 cm in each dimension, the RoI may be about 1 cm×1 cm. The more accurate the registration of the scanned image, the smaller the RoI may be. In general each extracted RoI contains an array of black and white pixels.

Figure 2:
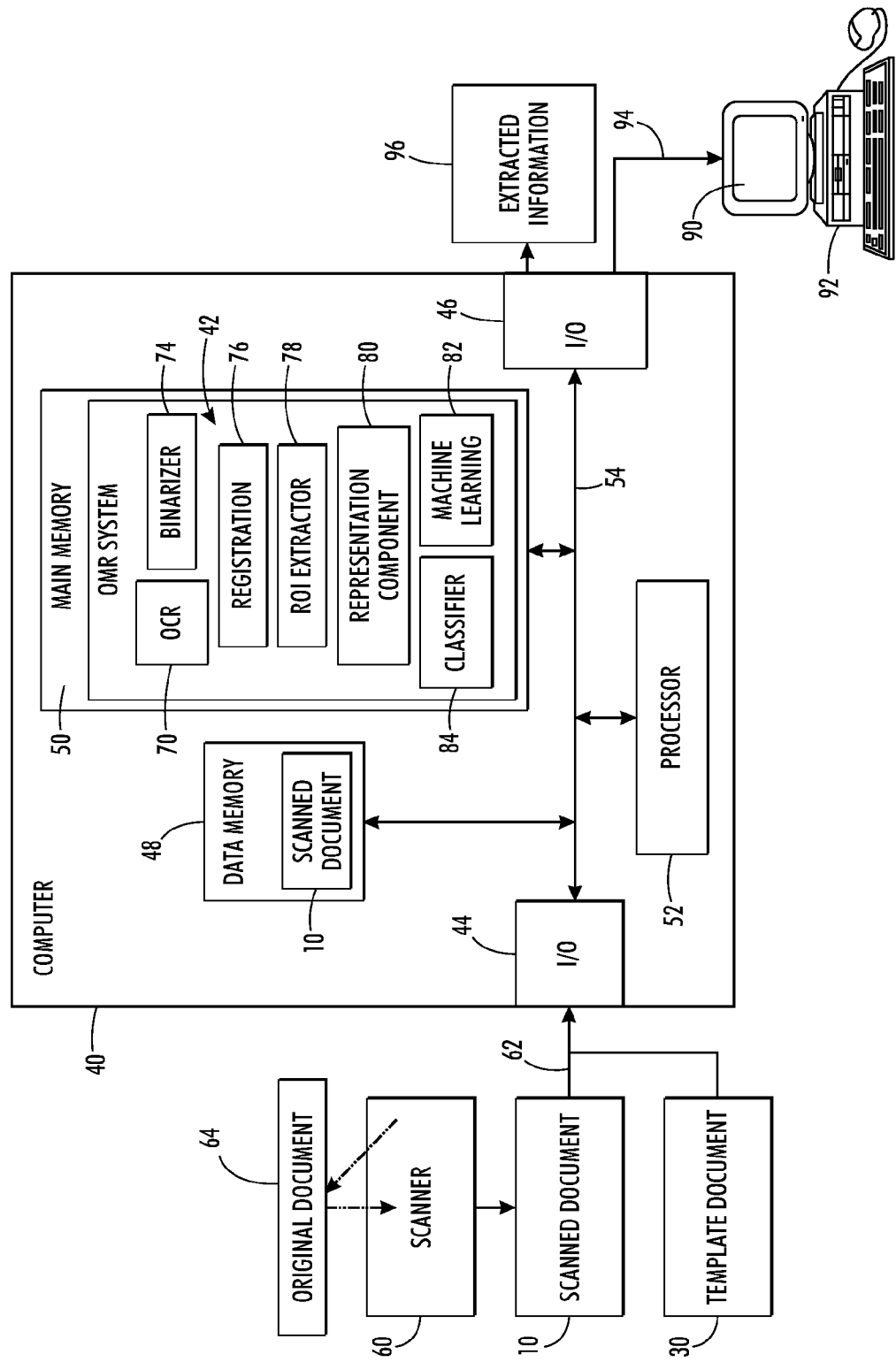
FIG. 2 is functional block diagram of an apparatus for mark recognition in accordance with one aspect of the exemplary embodiment.

FIG. 2 illustrates an apparatus 40 which hosts a system 42 for optical mark recognition.

The illustrated apparatus 40 includes one or more inputs/outputs 44, 46, for communicating with external devices, data memory 48, main memory 50, and a digital processor 52, all connected by a data/control bus 54. Apparatus 40 may be take the form of one or more computing devices, such as a general purpose computer or dedicated computing device, such as a desktop or laptop computer, PDA, web-based server, network server, or the like. The exemplary processor 52 controls the overall operation of the apparatus 40 by execution of processing instructions which are stored in the main memory 50 connected to the processor. OMR system 42 may be in the form of hardware or a combination of hardware and software. In the exemplary embodiment, memory 50 stores the OMR system 42 as software instructions which are executed by processor 52.

The memory 48, 50 can include random access memory (RAM), read-only memory (ROM), a hard disk, optical disk, combinations thereof, and the like, and may be physically located in the same computing device or parts thereof may be accessible to the computing device 40, e.g., via a local area network or the Internet.

The digital processor 52 can be variously embodied, such as by a single-core processor, a dual-core processor (or more generally by a multiple-core processor), a digital processor and cooperating math coprocessor, a digital controller, or the like.

Documents 10, 30 to be processed by system 42 are received by input 44 from a suitable source 60 of such documents, such as a scanner, camera, data storage device, or the like, via a wired or wireless link 62 and may be stored in a volatile portion of memory 48 during processing. In one embodiment, apparatus 10 forms a part of the scanning device 60, which, in turn, may form part of a multifunction device (MFD) having scanning, copying and optionally printing capabilities. In this embodiment, the computer 40 may be the MFD's digital front end and may also control functions of the MFD, such as printing, copying, and scanning.

In a typical scanner 60, a document sheet, such as an original paper form 64, is illuminated with light from a light source and the light reflected from the document sheet is recorded by a photosensitive device such as a CCD (charge coupled device) or CMOS (complementary metal oxide semiconductor) array, to be converted to digital image data. In one embodiment, a narrow strip of the document sheet is illuminated as the sheet is moved through a document handler, or the photosensitive device is moved relative to a platen on which the document sheet 64 is placed.

The system 42 may optionally include or have access to an optical character recognition (OCR) processor 70, e.g., stored in memory 50 and executed by processor 52, for processing the input scanned documents 10 and identifying printed words in each typed document 10. Alternatively, the documents may be OCR processed elsewhere, prior to input to the system 42, e.g., in the scanning device 60.

The exemplary system 42 includes various processing components 74, 76, 78, 80, 82, 84 which operate on an input scanned document 10. Components 70, 74, 76, 78, 80, 82, 84 may be in the form of hardware, software, or both, and may operate on the output of a prior one of the components. In the illustrated embodiment, these components are in the form of software instructions stored in memory 50 which are executed by the processor 52. Operation of these components is best understood with reference to the method described in greater detail below. Briefly, a binarizer 74 converts the input gray level image into a binary image in which each pixel of the image is either black or white (where black and white represent "on" and "off", respectively). Binarizer 74 can be omitted if the scanner output is binary. In general, black pixels are the pixels of interest since some of them may correspond to the user's marks, however, in a reverse image, the white pixels are considered as being black, i.e., "on".

Registration component 76 registers the image 10 using parameters of the original form 64 or template form 30 to allow identification of regions of interest 24, 26, etc., which are extracted by RoI extractor 78. Representation component 80 processes each extracted RoI to generate a representation of the extracted RoI, e.g., in the form of a vector using the recursive centers of gravity method described herein. During a training phase, a machine learning component 82 generates a classifier model based on labeled RoI training samples. The model is then used at runtime by a classifier 84 for assigning labels to unlabeled RoIs 24, 26. At this time, the machine learning component 82 is no longer needed and can be omitted. Classifier 84 can be a discriminative classifier, such as an sparse logistic regression (SLR) trained classifier. However, other types of classifier may be employed, such as a generative classifier, which allows targeting recall first, then focusing on precision in the recognition.

System 42 may be linked to a display 90, such as an LCD screen or computer monitor, which allows a reviewer to assess the accuracy of the system 42 in classifying documents based on optical recognition of the marks therein, e.g., by reviewing scanned documents 10 or portions thereof. The exemplary display 90 is associated with a client computing device 92, linked to the apparatus 40 by a wired or wireless link 94, such as cable, a local area network, or a wide area network, such as the Internet. In other embodiments, the system 42 may be hosted by the client computing device 92. At runtime, the system 42 outputs information 96, such as a class (e.g., checked/unchecked) for each extracted RoI 24, 26, etc. The information 96 may be further processed by the system, e.g., to compute a score, or to implement a further process, or may be exported from the system for further processing.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
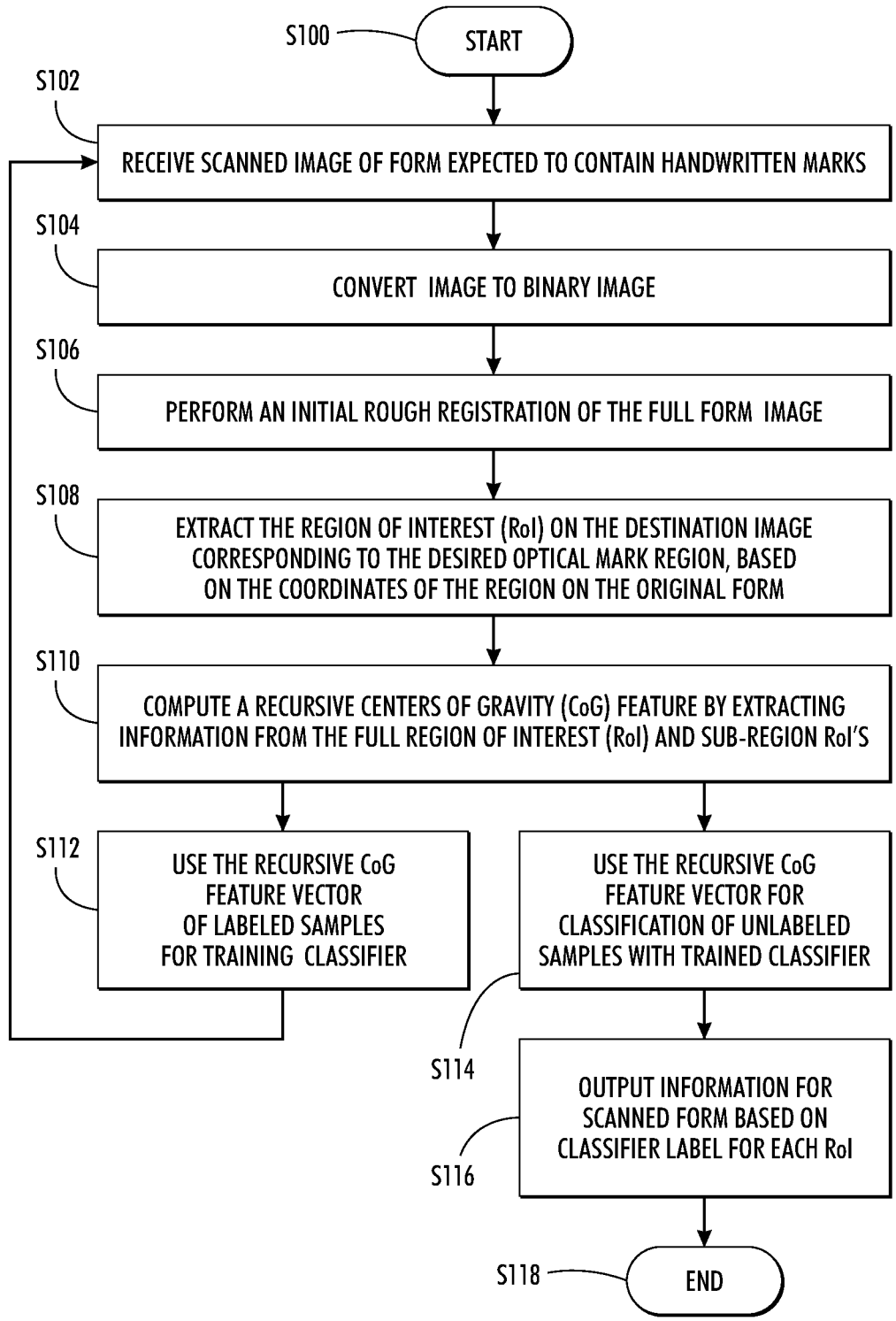
FIG. 3 is a flow diagram illustrating a method of mark recognition in accordance with another aspect of the exemplary embodiment.

FIG. 3 illustrates a mark recognition method which may be performed with the apparatus of FIG. 2. The method begins at S100.

At S102, a scanned image 10 of an original document 64 containing handwritten marks 16, 18 is input, e.g., from scanner 60, and stored in computer memory 48.

At S104, if the image 10 is a gray scale image, it may be converted to a binary image by thresholding (all pixels above a designated gray level are considered black, the rest are white). This step may be performed before S104, e.g., the scanner 60 may output a binary image.

At S106, an initial rough registration may be performed for the full form image. For example, during scanning, the form might be slightly shifted in one or both lateral dimensions (i.e., horizontal and vertical), or even stretched or rotated. Thus, it is desirable to take some form of corrective action after the form has been converted to digital values in order align it. For accurate registration, a transformation vector between the original form and the destination form may be computed. A less accurate method, but one which is generally satisfactory for the present application, makes use of specialized "registration marks," (also known as "fiducial" marks) which are intended to be easily recognized and which are printed on the form at precisely predetermined locations. When these marks are present on the form, computer algorithms can then be used to examine the digital representation of the form and locate these marks. Given the actual location of the registration marks on the scanned image and a different desired location, mathematical transformations may be used to digitally reorient the form within the computer so the designated areas coincide with those of a perfectly registered form. Alternatively, the scanned form may be left uncorrected and a similar transformation used to calculate where the designated areas may be found on the destination form. Other methods of registration are described, for example, in U.S. Patent Nos. 7,573,616, 6,741,738 and U.S. Pub. No. 20090232404, the disclosures of which are incorporated herein in their entireties. Available software for registration include UnwarpJ (see, Ignacio Arganda-Carreras, Carlos O.S. Sorzano, Roberto Marabini, Jose M. Carazo, Carlos Ortiz de Solorzano, and Jan Kybic, "Consistent and Elastic Registration of Histological Sections using Vector-Spline Regularization," Lecture Notes in Computer Science, Springer Berlin/Heidelberg, volume 4241/2006, *CVAMIA: Computer Vision Approaches to Medical Image Analysis*, pages 85-95, 2006), elastix (see elastix website), and the Insight Segmentation and Registration Toolkit (ITK) (see itk website).

At S108, one or more regions of interest (RoI) 24, 26 are extracted from the image 10. Various methods for RoI extraction are contemplated. In one embodiment, for each new type of form to be processed, a human operator highlights the regions of interest, for example, by moving the cursor to each check box in turn and clicking on it. The system suggests the perimeter of the ROI, based on an examination of the surrounding pixels. The user can modify this if it has not correctly identified. Once all the regions have been identified and their coordinates stored, the system generates an enlarged region to allow for registration errors. In another embodiment, for each type of form to be processed, a blank form 30 is provided showing only the checkboxes and other designated fields. The system automatically identifies each of the designated fields assuming that both forms have undergone a corresponding transformation during scanning and generates coordinates of an RoI slightly larger than the designated respective region. The coordinates of each ROI 24, 26 of a particular form type are stored in memory.

Each RoI on the destination image 10 corresponds to a desired optical mark region 20, 22, based on the coordinates of the region on the original form 64, and the optional transformation that was computed at S106, Each RoI 24, 26 is extracted as a 2-dimensional array of black/white pixels.

If different types of documents are received for processing, the RoI identification step may be preceded by a document type identification step. In one embodiment OCR processing is used to identify some of the text and this is compared with text of a known set of forms to identify the most likely type of form being processed. The RoIs for that form type are then retrieved from memory. In another embodiment, each form includes an embedded code, such as a barcode, Dataglyph or Datamatrix, which is easily identified within the scanned form by appropriate processing techniques.

At S110, for each extracted RoI 24, 26, a recursive centers of gravity (RCoG) feature is computed, e.g., as a vector, which includes extracting data from the full RoI and sub-RoIs thereof, based on the respective distribution of back pixels. This step is described in further detail below, with reference to FIG. 4.

At S112, in a training phase, a classifier model is learned based on vectors computed at S110 and corresponding labels for a set of positively and negatively labeled training sample RoIs.

At S114, in a classifying phase, the classifier model outputs a label for each identified RoI 24, 26, based on its computed vector, or otherwise assigns a mark recognition state to the region of interest. For example, the state may be "checked" or "unchecked", in the case of a check box, or "signed" or "unsigned" for a signature box.

At S116, information based on the classifier outputs for each ROI in a scanned form may be output from the system 42 and/or stored in memory for further processing.

The method ends at S118.

Figure 4:
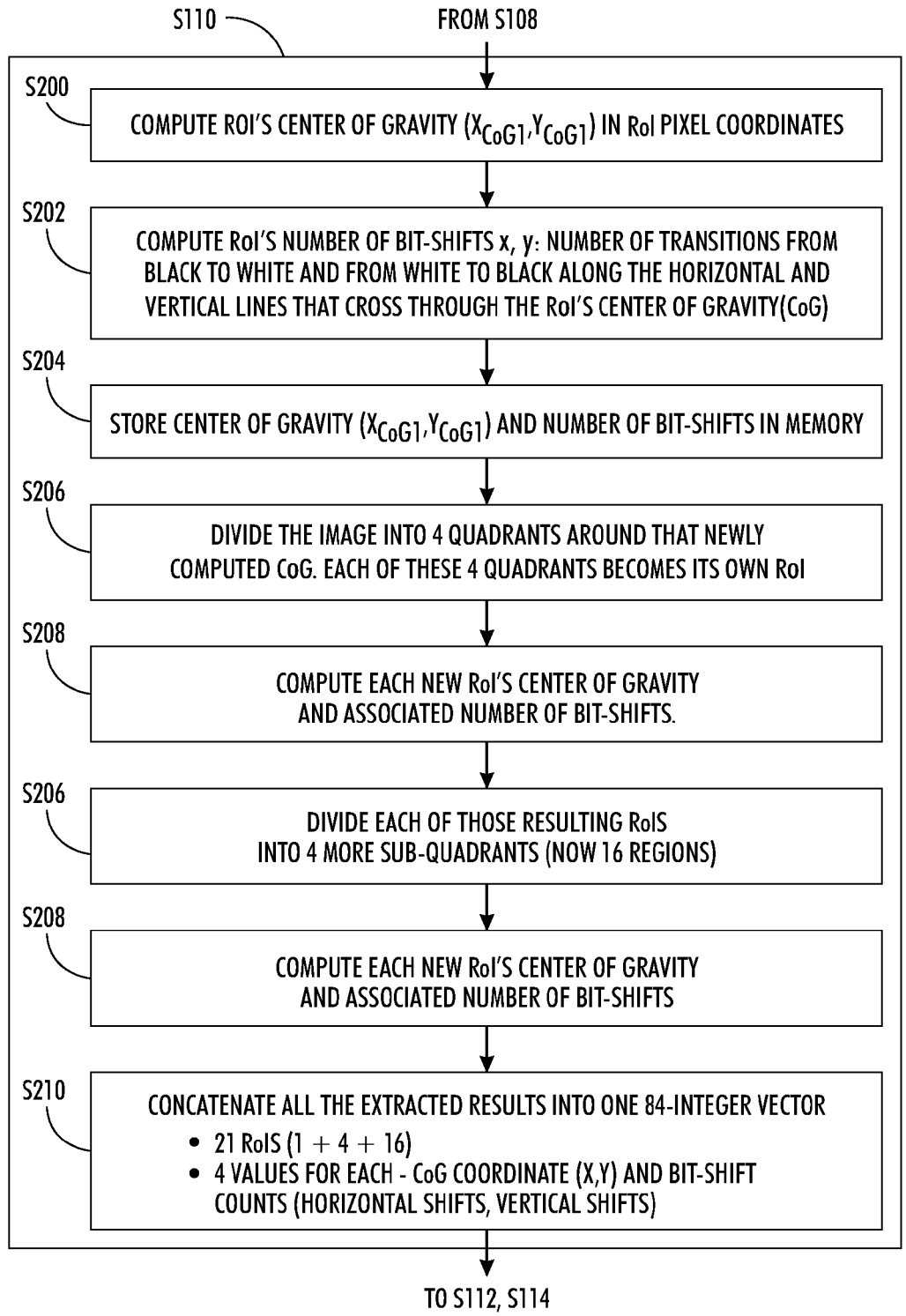
FIG. 4 illustrates aspects of the method of FIG. 3 in which a recursive centers of gravity vector is computed.
Figure 5:
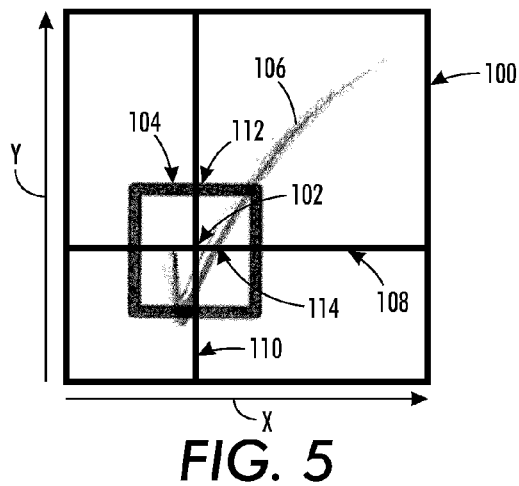
FIG. 5 illustrates a region of interest extracted from a scanned document, such as that of FIG. 1, with its center of gravity identified.
Figure 6:
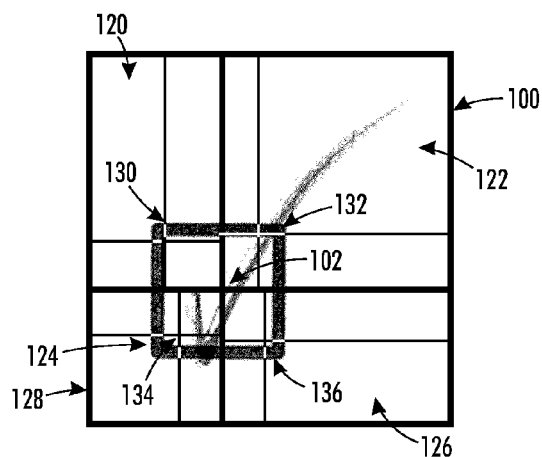
FIG. 6 illustrates the region of interest of FIG. 5 after a first set of recursive centers of gravity has been identified.
Figure 7:
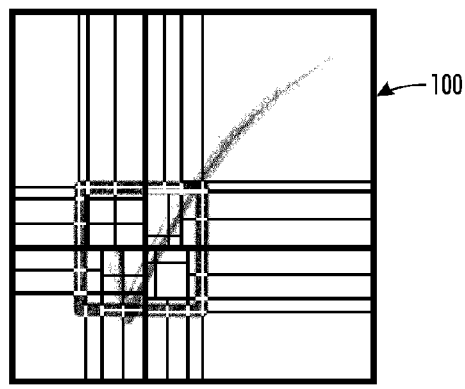
FIG. 7 illustrates the region of interest of FIG. 6 after a second set of recursive centers of gravity has been identified.

FIG. 4 illustrates computation of the RCoG feature (S110). FIGS. 5-7 illustrate the process on an exemplary extracted RoI 100, analogous to RoIs 24, 26.

The method proceeds from S108 to S200, where coordinates of the center of gravity (CoG) 102 of all black pixels in the full RoI 100 are computed (in RoI coordinates). For example, the bottom left corner of the RoI is assigned X,Y coordinates of (0,0). The CoG 102 has coordinates ($X_{COG1}$, $Y_{COG1}$) where:

$X_{COG1}$=average of X coordinates of all black pixels in the RoI 100, and $Y_{COG1}$=average of Y coordinates of all black pixels in the RoI 100.

Other methods of computing the CoG 102's coordinates based on a distribution of the black pixels in the region of interest are also contemplated.

As will be appreciated from FIG. 5, the RoI 100 includes pixels derived from a printed check box 104 as well as from the check mark 106 corresponding to the user's applied mark 16. The computing of the CoG does not distinguish between pixels in the check box and pixels derived from the human applied check mark.

Locations of mutually perpendicular, horizontal and vertical lines 108, 110 are also computed. These lines intersect at the CoG 102 and extend the respective width X and height Y of the RoI 100 (FIG. 5).

Figure 8:
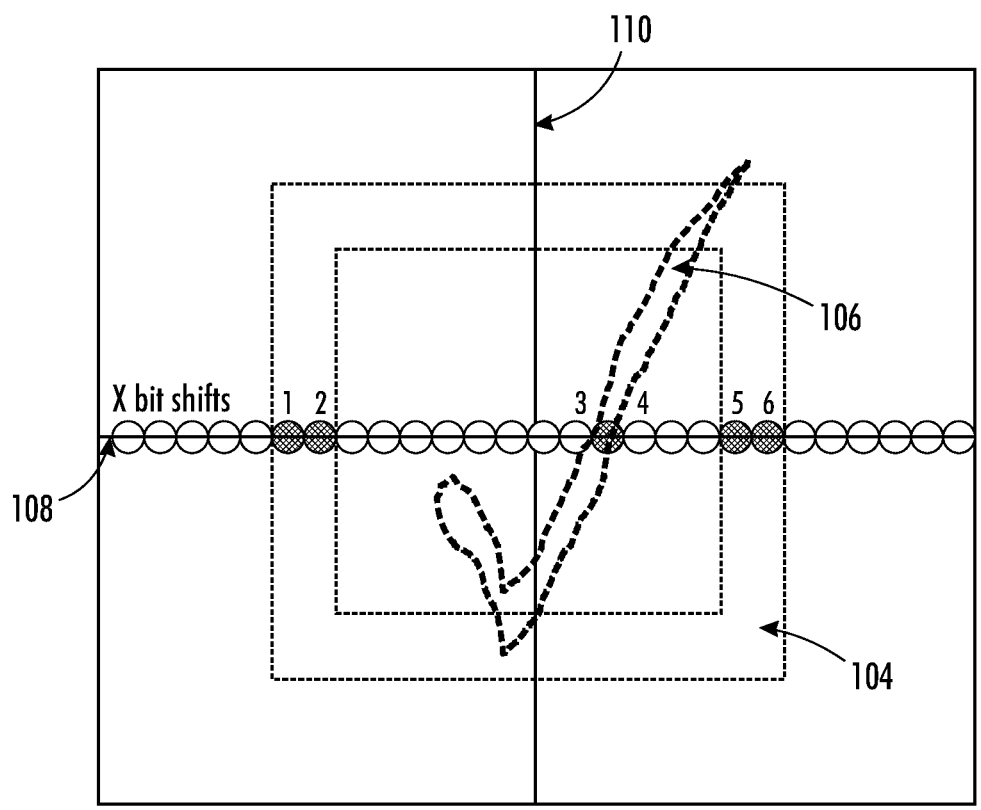
FIG. 8 is a greatly enlarged view of a portion of the region of interest of FIG. 5.

At S202 a number of bit-shifts x, y is computed for RoI 100. This is the number of transitions from black to white and from white to black along the horizontal and vertical lines 108, 110. The number of x bit-shifts is obtained by traversing the horizontal line 108 and incrementing the number by one each time a change from a black pixel to a white pixel or a white pixel to a black one occurs. The number of y bit-shifts is obtained by traversing the vertical line 110 and incrementing the number each time a change from black to white or white to black occurs. For example, in the case of the checkbox shown in FIG. 5, if the checkbox 104 is two pixels wide and the part of the check mark 106 crossing through line 108 at 114 is one pixel wide, then the number of x bit-shifts is 6 as illustrated in FIG. 8 (not to scale).

At S204, the values for the newly computed CoG 102 is stored in memory 48, including its CoG coordinates ($X_{COG1}$, $Y_{COG1}$) and number of bit-shifts x, y.

At S206, the RoI image 100 is partitioned into sub-RoIs 120, 122, 124, 126 (FIG. 6). Specifically, the RoI 100 is divided into four quadrants around the computed CoG 102. As can be seen, the rectangular quadrants 120, 122, 124, 126 can be of unequal size and are defined by the intersecting horizontal and vertical lines 108, 110 and border 128 of the RoI 100. For each sub-RoI 120, 122, 124, 126, its CoG 130, 132, 134, 136, ($X_{COG2A}$, $Y_{COG2A}$) ... ($X_{COG2D}$, $Y_{COG2D}$), is computed as for S200, and associated number of bit-shifts, ($x_{2A}$,$Y_{2A}$) ... ($x_{2D}$,$Y_{2D}$), computed for each sub-RoI 120, 122, 124, 126, as for S202. This information is stored for each sub-RoI in memory 48.

One or more iterations of S206 are optionally performed. For example, at S208, a repeat of S206 is performed for each of the sub-RoIs. Specifically, each sub-RoI 120, 122, 124, 126 is divided into four sub-quadrants (FIG. 7) (i.e., 16 sub-sub RoIs in all), and S200 and S202 are performed on each of the 16 sub-sub RoIs to obtain a respective CoG and number of bit-shifts, for each sub-sub RoI.

At S210, a representation of the RoI 100 is generated from the information extracted at one or more iterations, e.g., from the each of the RoIs 100, 110, 112, 114, 116 and their 16 sub-RoIs. For example, all the extracted results are concatenated into one vector $f_v$. Since there are 21 RoIs in the exemplary embodiment (1+4+16), and for each RoI there are four values, CoG coordinate (X,Y) and bit-shift counts (horizontal shifts, vertical shifts), the resulting vector $f_v$ is an 84-integer vector.

While an 84 element feature vector obtained by considering the values from the original RoI and two recursive iterations has been found to provide a good balance between the accuracy of the trained model and the number of training samples needed to adequately train the model, it is also contemplated that a feature vector may be generated with fewer or more than 84 elements. For example, it is contemplated that a feature vector with 68 elements could be generated from the original RoI and the second iteration (a combination of FIGS. 5 and 7) or a feature vector with 80 elements from the second and third iterations. However, since a discriminative classifier is able to learn which features are best for categorizing the sample, there is no real need for a human operator to try to select particular ones of the features. It is also contemplated that elements from a third iteration could be included in a feature vector.

In the training phase (S112), the corresponding vector $f_v$ is used by the machine learning component 82 to train a classifier model. For example, each provided sample RoI is provided with a tag which may be "positive" or "negative," depending on whether the designated field 16, 20 (e.g., a checkbox) is checked/otherwise marked or left blank. Classifier training can be based on sparse logistic regression (SLR), logistic regression, support vector machines, or any other suitable discriminative or generative classifier. The machine learning component 82 trains the model of classifier 84 on the two classes: positive (marked/signed) vs. negative (unchecked/empty) samples of the same region family. The classifier is trained to output a probability of an unlabeled RoI being positive or negative based on its computed feature vector $f_v$. The probability can be thresholded to provide an output corresponding to a single one of positive and negative.

In the classification phase (S114), where the machine learning component 82 can be omitted from the system, a vector $f_v$ is extracted from each extracted RoI 24, 26, 100 in the scanned form, i.e., from the array of black and white pixels. The vector $f_v$ is input to the classifier model and is assigned a positive or negative label, or other mark recognition state, based on the vector $f_v$.

The label output by the system 42 can be used by a form processing component (not shown) which extracts information from the form (S116), based on which ones of the designated fields were determined to be checked or otherwise marked. For example, in a standardized test, an algorithm may assign a positive score if a certain box is checked (a correct answer), and optionally assign a negative score if another designated checkbox is checked (wrong answer). For administrative forms, other types of information may be extracted, such as whether the person has signed the form (if not, it will be rejected), and so forth.

The method illustrated in FIGS. 3 and 4 may be implemented in a computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3 and 4, can be used to implement the method for optical mark recognition.

The exemplary recursive CoG method has been found to be more resilient to translations than conventional methods, which typically include counting black pixels. The method is also more resilient to dithering and thresholding variations. Test results show the error rate for the conventional black pixel method to be about 3-4%, while the exemplary method reduces the error rate to less than 0.1%.

The method may also be used to learn different mark types. For example, in the case of filled in bubbles, where the user is instructed to completely fill in the bubble rather than providing a check mark, the machine learning component can learn a classifier model based on samples of images of bubbles considered to be filled in and bubbles considered not to be filled in. For example, a human observer may be instructed to label a bubble with a dot in it as not filled in.

Modifications to the Training Step

For building a representative classifier model, it may be desirable to employ a relatively large number of positive and negative training samples.

To speed up the collection of training samples, an automated process may be used to identify those samples which have a very high probability of being either positive or negative. For example, black pixel count can be used to pre-tag obviously positive or obviously negative candidates.

Two thresholds, $\lambda_{min}$ and $\lambda_{max}$, are defined that will be used to identify obvious samples. All samples having more than $\lambda_{max}$ black pixels will be automatically considered as "marked", and those having less than $\lambda_{min}$ black pixels are considered as blank.

Using this method, a large portion of easily classified samples can be automatically assigned to the positive or negative class, leaving only suspect samples for validation by an operator. At least initially, an operator may review the sample and automatically-assigned label and correct any mislabeled samples.

The thresholds $\lambda_{min}$ and $\lambda_{max}$ may be defined by any of the following methods or by a combination thereof:

A) Set once for all (manually), and fixed throughout the collection of training samples;

B) Adaptive—$\lambda_{min}$ and $\lambda_{max}$ are initially set at extremely conservative values. As more positive and negative samples are accumulated, $\lambda_{min}$ and $\lambda_{max}$ are adjusted when enough statistical confidence has been accumulated.

C) Context-sensitive: $\lambda_{min}$ and $\lambda_{max}$ are adjusted depending on the total number of black pixels in the image. For example, if the form is darker (more black pixels overall), a higher $\lambda_{min}$ threshold and/or higher $\lambda_{max}$ may be applied by the image pre-processing, since the OMR regions will also be impacted by the overall darkness.

Without intending to limit the scope of the exemplary embodiment, the following Example, demonstrates operation of the exemplary system on input samples.

EXAMPLE

A comparison of the exemplary 84-elements vector recursive center of gravity (RCoG) method described herein was made with two other methods for evaluating presence of marks in designated fields. These other methods are referred to as runlength (RL) and black pixel (BP).

In the runlength method, runlength histograms are computed. Each runlength histogram is a histogram of occurrences of runlengths. A runlength is the number of successive pixels in a given direction in a scanned image that belong to the same quantization interval (here there are only two, black and white). Further details on this method are described in co-pending application Ser. No. 12/251,689, filed Oct. 15, 2008, entitled REPRESENTING DOCUMENTS WITH RUNLENGTH HISTOGRAMS, by Florent C. Perronnin, the disclosure of which is incorporated herein by reference. Here a representation of an extracted RoI can be generated from runlength histograms of regions of the RoI at S110, and thus feature subsequently used in S112 and S114 of the method of FIG. 3. The regions can be generated as follows: first, a RL histogram is computed on the RoI 24, 26. Then the RoI is subdivided into 4 regions (uniform grid) and the 4 RL histograms for the equally-sized sub-RoIs are computed. This step is repeated (still on a uniform grid) for each subregion to obtain 16 new RL histograms. The RunLength feature is generated is composed of 21 histograms (1(whole RoI)+4 (first four subdivisions)+4×4(second recursive subdivisions)) histograms.

In the black pixel method, the number of black pixels in a region of interest is compared with a threshold value. If the number meets or exceeds the threshold, the region is considered to be marked.

Figure 9:
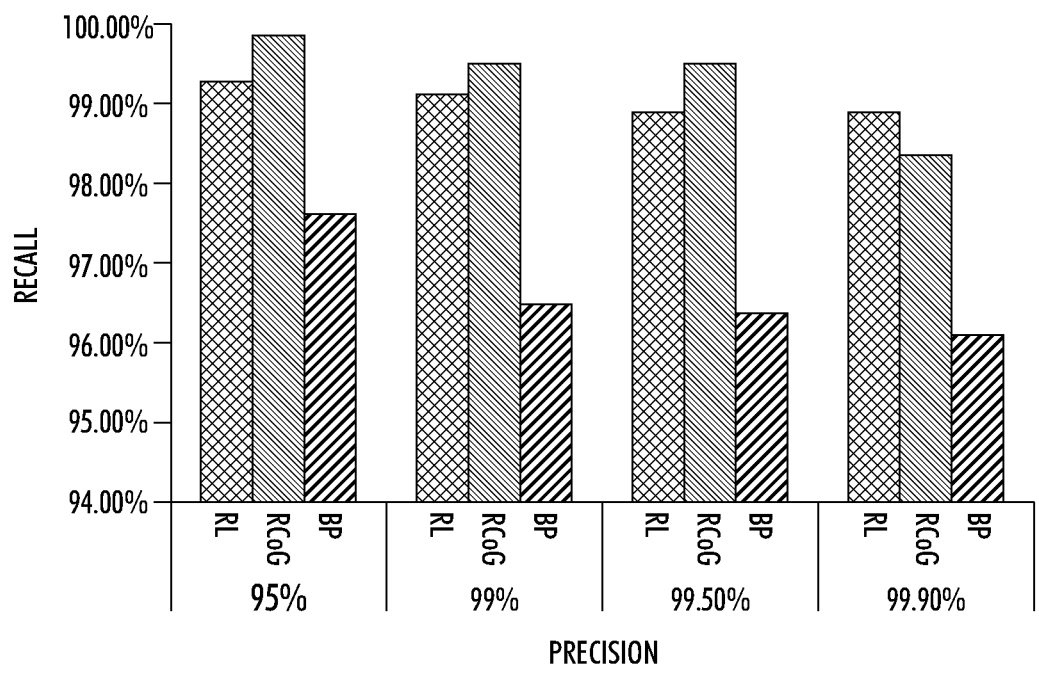
FIG. 9 is a graph illustrating results of the exemplary method compared with those of existing methods.

Results on recall vs. precision are shown in FIG. 9. Precision is the number of true positives (i.e., the number of items correctly labeled as belonging to the positive class) divided by the total number of elements labeled as belonging to the positive class (i.e., the sum of true positives and false positives, which are items incorrectly labeled as belonging to the class). Recall is the number of true positives identified divided by the total number of elements that actually belong to the positive class (i.e., the sum of true positives and false negatives, which are items which were not labeled as belonging to the positive class but should have been). Precision and recall can alternatively be described for the negative class.

The RCoG technique described herein is clearly much more robust than traditional "black pixel" count methods. There is even a slight improvement over the more computationally expensive run-length method, except at high precision levels. The run-length method has been found to be useful in identifying the type of form and thus a combination of these two techniques may be used in aspects of the exemplary method.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for mark recognition in an image of an original document, comprising:
 a) receiving an image of an original document in which at least one designated field is provided for accepting a mark applied by a user;
 b) extracting a region of interest from the image which includes pixels, at least some of the pixels corresponding to the designated field;
 c) determining a center of gravity of the region of interest based on a distribution of black pixels in the region of interest;
 d) for each of a plurality of iterations:
  i) partitioning the region of interest into sub-regions of interest, based on the determined center of gravity, where at a subsequent one of the iterations, sub-regions generated at an immediately prior iteration serve as respective regions of interest;
  ii) for each of a plurality of the sub-regions of interest, extracting data from the sub-region of interest based on a distribution of black pixels in the sub-region of interest;

e) generating a representation of the extracted region of interest based on the data extracted from the plurality of sub-regions of interest for at least one of the iterations; and f) based on the representation, assigning a mark recognition state to the region of interest.

2. The method of claim 1, wherein the assigned mark recognition state is selected from positive and negative.

3. The method of claim 1, wherein at least one designated field comprises one of a check box and a signature box.

4. The method of claim 3, wherein when the designated field is a check box, the mark recognition state corresponds to one of checked and unchecked and wherein when the designated field is a signature region, the mark recognition state corresponds to one of present and absent.

5. The method of claim 1, wherein the extracting data from the sub-region of interest comprises determining a center of gravity of the sub-region of interest.

6. The method of claim 5, wherein each center of gravity is computed as an average of coordinates of all black pixels in the respective region of interest or sub-region of interest.

7. The method of claim 1, further comprising determining bit-shifts across mutually perpendicular lines through the center of gravity of the region of interest and determining bit-shifts across mutually perpendicular lines through a center of gravity of each of the plurality of sub-regions of interest in at least one of the iterations, the extracted data used in generating the representation comprising the bit shifts determined for the region and sub-regions.

8. The method of claim 1, wherein the representation of the region of interest comprises a vector.

9. The method of claim 8, wherein the vector comprises at least 80 values.

10. The method of claim 8, wherein the vector comprises center of gravity coordinates for the region of interest and for each sub-region generated.

11. The method of claim 10, wherein the vector further comprises bit-shifts determined for the region of interest and for each of the sub-regions generated.

12. The method of claim 1, wherein there are at least two iterations.

13. The method of claim 12, wherein the representation of the extracted region of interest is generated based on the data extracted from the plurality of sub-regions of interest for each of the at least two iterations.

14. A computer program product comprising non-transitory media encoding instructions, which when executed on a computer causes the computer to perform the method of claim 1.

15. A system for mark recognition comprising:
memory which stores instructions for performing the method of claim 1; and
a processor in communication with the memory for executing the instructions.

16. An apparatus for mark recognition comprising:
the system of claim 15 and a scanner which provides the image of the original document to the system.

17. A method for mark recognition in an image of an original document, comprising:
a) receiving an image of an original document in which at least one designated field is provided for accepting a mark applied by a user;
b) extracting a region of interest from the image which includes pixels, at least some of the pixels corresponding to the designated field;

c) determining a center of gravity of the region of interest based on a distribution of black pixels in the region of interest;

d) for at least one iteration:
i) partitioning the region of interest into sub-regions of interest, based on the determined center of gravity, where in a subsequent iteration, sub-regions generated at an immediately prior iteration serve as respective regions of interest, the partitioning of the region of interest comprising partitioning of the region of interest into four quadrants that are defined by two mutually perpendicular lines that intersect at the center of gravity of the region of interest, and by a border of the region of interest, each of the plurality of sub-regions comprising a respective quadrant;
ii) for each of a plurality of the sub-regions of interest, extracting data from the sub-region of interest based on a distribution of black pixels in the sub-region of interest;

e) generating a representation of the extracted region of interest based on the data extracted from the plurality of sub-regions of interest for at least one of the iterations; and f) based on the representation, assigning a mark recognition state to the region of interest.

18. The method of claim 1, wherein the plurality of sub-regions comprises four sub-regions.

19. The method of claim 1, further comprising at least one of:
outputting the assigned mark recognition state; and
outputting information about the original document based on the assigned mark recognition state.

20. The method of claim 1, further comprising scanning the original document to generate the image.

21. The method of claim 1, wherein at least one of b), c), d), e), and f) is performed by processor of a computing device.

22. The method of claim 1, wherein the assigning of the mark recognition state comprises inputting the representation of the region of interest to a classifier trained to output mark recognition states based on respective input representations.

23. The method of claim 22, further comprising training the classifier with a set of labeled regions of interest extracted from images of original documents and their respective representations generated according to a) to e) of the method of claim 1.

24. A method for mark recognition in an image of an original document, comprising:
a) scanning the original document, in which at least one designated field is provided for accepting a mark applied by a user, to generate a scanned image and receiving the scanned image into memory;
with a processor in communication with the memory:
b) extracting a region of interest from the scanned image which includes an array of pixels, at least some of the pixels corresponding to the designated field;
c) extracting data comprising at least one of:
i) a center of gravity from the region of interest based on a distribution of black pixels in the region of interest; and
ii) bit shifts across mutually perpendicular lines through the center of gravity of the region of interest;
d) for each of a plurality of iterations:
i) partitioning the region of interest into sub-regions of interest, where at a subsequent one of the iterations, sub-regions generated at an immediately prior iteration serve as respective regions of interest;
ii) for each of the sub-regions of interest, repeating c);

e) generating a representation of the extracted region of interest based on the data extracted from the region of interest and sub-regions of interest; and f) based on the representation, assigning a mark recognition state to the region of interest with a trained classifier.

25. A system for mark recognition in an image of an original document, comprising:

memory which receives an image of an original document in which at least one designated field is provided for accepting a mark applied by a user;

a region of interest extraction component which is configured for extracting regions of interest from the image, such that each region of interest includes pixels corresponding to a respective one of the designated fields;

a representation generation component which generates a representation of the regions of interest comprising, for each of a plurality of iterations:

partitioning the region of interest into four sub-regions of interest, the sub-regions being quadrants that are defined by two mutually perpendicular lines, which intersect at a center of gravity of the region of interest, and by a border of the region of interest, where at a subsequent one of the iterations, sub-regions generated at an immediately prior iteration serve as respective regions of interest, extracting data from the sub-region of interest based on a distribution of black pixels in the sub-region of interest, and generating a representation of the extracted region of interest based on the extracted data; and a classifier which, based on the representation, assigns a mark recognition state to the region of interest.

* * * * *

UNITED STATES PATENT AND TRADEMARK OFFICE
CERTIFICATE OF CORRECTION

PATENT NO. : 8,600,165 B2  Page 1 of 1
APPLICATION NO. : 12/704792
DATED : December 3, 2013
INVENTOR(S) : Nicolas Raphaël Saubat et al.

It is certified that error appears in the above-identified patent and that said Letters Patent is hereby corrected as shown below:

On Title page, Item (75), lines 1-6:
Nicolas Raphaël Saubat, Sainte-Geneviéve-des-bois (FR);
Francois Ragnet, Venon (FR);
Philippe Rerole, Fontaine (FR);
Eric H. Cheminot, Meylan (FR);
John A. Moore, Victor (FR)

Should be replaced with:

Nicolas Raphaël Saubat, Sainte-Geneviéve-des-bois (FR);
Francois Ragnet, Venon (FR);
Philippe Rerole, Fontaine (FR);
Eric H. Cheminot, Meylan (FR);
John A. Moore, Victor, NY (US)

Signed and Sealed this
Twenty-ninth Day of April, 2014

Michelle K. Lee
*Deputy Director of the United States Patent and Trademark Office*